United States Patent [19]

Adams et al.

[11] Patent Number: 5,601,712
[45] Date of Patent: Feb. 11, 1997

[54] CENTRIFUGAL APPARATUS FOR BIOLOGICAL WASTE DISPOSAL

[75] Inventors: Mathew J. Adams; Kenneth R. Lamaster, both of Indianapolis; David B. Mennel; Jeffrey C. Rapp, both of Greenwood, all of Ind.; Lewis I. Schwartz, Bratenahl; Norman L. Siegel, Mentor, both of Ohio; Joseph H. Wilson, Speedway, Ind.

[73] Assignee: Ecomed, Inc., Indianapolis, Ind.

[21] Appl. No.: 468,368

[22] Filed: Jun. 6, 1995

Related U.S. Application Data

[62] Division of Ser. No. 209,818, Mar. 11, 1994, Pat. No. 5,534,162.

[51] Int. Cl.⁶ .................................................. B01D 21/26
[52] U.S. Cl. ..................... 210/297; 210/315; 210/317; 210/380.1; 209/199
[58] Field of Search .................................... 209/199, 268, 209/270, 350, 940; 422/28, 247; 210/315, 317, 360.1, 369, 380.1, 386.2, 391, 393, 416.1

[56] References Cited

U.S. PATENT DOCUMENTS

| | | | |
|---|---|---|---|
| 2,656,985 | 10/1953 | Backlund et al. | 241/88 |
| 2,660,210 | 11/1953 | Berglind . | |
| 2,820,595 | 1/1958 | Schumacher | 241/99 |
| 2,912,176 | 11/1959 | Jordan | 241/194 |
| 3,017,030 | 1/1962 | Alexander et al. | 210/380.2 |
| 3,049,306 | 8/1962 | Nowlin | 241/46 |
| 3,156,278 | 11/1964 | Otto | 146/67 |
| 3,181,802 | 5/1965 | Lung et al. | 241/257 |
| 3,186,652 | 6/1965 | Hardy et al. | 241/257 |
| 3,211,389 | 10/1965 | Sherman, Jr. | 241/257 |
| 3,386,668 | 6/1968 | Shepherd | 241/46 |
| 3,389,864 | 6/1968 | Topinka | 241/141 |
| 3,403,865 | 10/1968 | Guth et al. | 241/194 |
| 3,434,518 | 3/1969 | Motis . | |
| 3,436,029 | 4/1969 | Lopp et al. | 241/194 |
| 3,528,469 | 9/1970 | Mantelet | 146/68 |
| 3,596,692 | 8/1971 | Swanke | 146/68 |
| 3,814,332 | 6/1974 | Nakao | 241/38 |
| 3,827,985 | 8/1974 | Haan et al. | 210/179 |

(List continued on next page.)

FOREIGN PATENT DOCUMENTS

| | | |
|---|---|---|
| 1394972 | 3/1965 | France . |
| 194339A | 3/1985 | Germany . |
| 61-025432A | 2/1986 | Japan . |
| 725700 | 4/1980 | U.S.S.R. . |
| 1142167A | 2/1985 | U.S.S.R. . |
| 1546076A1 | 2/1990 | U.S.S.R. . |
| WO91/17099 | 4/1990 | WIPO . |

*Primary Examiner*—David A. Reifsnyder
*Attorney, Agent, or Firm*—Brinks Hofer Gilson & Lione

[57] ABSTRACT

A method and apparatus are provided for removing liquids from biological waste by the employment of centrifugal force to separate the liquid from the biological waste particulate and into a container separate from a biological waste container, permitting the dried biological waste and removed liquid to be separately and conveniently disposed of. Preferably, a rotatable drum can be rotatably supported within an outer liquid-tight drum, and a disposable porous container, such as a bag made of porous material, can be placed within the rotatable foraminous drum. Biological waste can be placed within the porous, disposable container within the rotatable drum, and the rotatable drum can be rotated at a rate of rotation sufficient to substantially transfer unabsorbed liquid from the biological waste through the disposable porous container and the openings in the foraminous inner drum to the outer liquid-tight collection drum. Solid biological waste may then be disposed of by removing the disposable porous container from the rotatable drum with the solid biological waste therein, avoiding by closure of disposable porous container, exposure of handling personnel to the solid biological waste. The collected liquids may be separately disposed of by pumping them into a sanitary sewer. If it is desired, additional liquid, such as a microbial decontaminating agent, may be added within the porous disposable bag as it is being rotated.

27 Claims, 5 Drawing Sheets

U.S. PATENT DOCUMENTS

| | | | |
|---|---|---|---|
| 3,901,349 | 8/1975 | DeNoyer. | |
| 4,194,697 | 3/1980 | Lembeck | 241/92 |
| 4,269,364 | 5/1981 | Moriconi et al. | 241/36 |
| 4,275,848 | 6/1981 | Webb, Sr. | 241/46 |
| 4,403,484 | 9/1983 | Fey et al. | 210/380.2 |
| 4,523,993 | 6/1985 | Farber | 210/380.1 |
| 4,578,185 | 3/1986 | Wilson et al. | 210/85 |
| 4,586,666 | 5/1986 | Fox | 241/282.2 |
| 4,609,156 | 9/1986 | Boele | 241/199 |
| 4,618,103 | 10/1986 | Wilson et al. | 241/41 |
| 4,619,409 | 10/1986 | Harper et al. | 241/38 |
| 4,637,561 | 1/1987 | Edberg | 241/154 |
| 4,809,915 | 3/1989 | Koffsky et al. | 241/36 |
| 4,816,307 | 3/1989 | Honeycutt | 428/34.1 |
| 4,852,814 | 8/1989 | Amiot et al. | 241/37.5 |
| 4,860,961 | 8/1989 | Hilgarth | 241/92 |
| 4,878,627 | 11/1989 | Otto | 241/199.12 |
| 4,884,756 | 12/1989 | Pearson | 241/42 |
| 4,889,290 | 12/1989 | Koffsky et al. | 241/36 |
| 4,955,548 | 9/1990 | Rahill | 241/30 |
| 4,971,261 | 11/1990 | Solomons | 241/99 |
| 4,972,950 | 11/1990 | Shillington | 206/366 |
| 4,973,005 | 11/1990 | Haesebrouck et al. | 241/194 |
| 4,984,747 | 1/1991 | Lechner | 241/55 |
| 4,984,748 | 1/1991 | Kimura | 241/65 |
| 5,018,675 | 5/1991 | Gateaud | 241/282.2 |
| 5,022,548 | 6/1991 | Stakis | 220/23.83 |
| 5,054,696 | 10/1991 | Mennel et al. | 241/34 |
| 5,089,228 | 2/1992 | Meijer | 422/37 |
| 5,143,615 | 9/1992 | Roy et al. | 210/350 |
| 5,236,135 | 8/1993 | Wilson et al. | 241/21 |
| 5,240,187 | 8/1993 | Wilson | 241/21 |

5,601,712

CENTRIFUGAL APPARATUS FOR BIOLOGICAL WASTE DISPOSAL

This application is a division of application Ser. No. 08/209,818 filed Mar. 11, 1994, now U.S. Pat. No. 5,534,162.

FIELD OF THE INVENTION

This invention relates to method and apparatus for disposal of wet biological waste and more particularly, relates to method and apparatus for separating, for separate and convenient disposal, liquid and solid biological waste, for example, from a mixture of decontaminating liquid and disintegrated biological waste.

BACKGROUND OF THE INVENTION

Solid biological waste, such as medical and surgical waste, dental waste, veterinary waste, mortuary waste, laboratory waste and the like, frequently includes unabsorbed fluids and is sometimes mixed with a decontaminating liquid as a result of decontamination techniques. In biological waste disposal systems, solid biological waste is frequently disintegrated, or minced, into particles and washed with a decontaminating liquid to prepare the waste for disposal. Mixtures of biological waste with body fluids and used decontaminating agents are unsightly and handling such waste can be obnoxious to some people.

It is desirable to dispose of solid biological waste in a substantially non-wet state. In addition, it is desirable and convenient to dispose of biological waste fluids, such as used decontaminating agents, separately, for example, by the use of sanitary sewers. Accordingly, the convenient and effective removal and separation of decontaminants and other liquids from the biological waste prior to their disposal is desirable, and there is a need for a method and apparatus for removing liquids, such as used decontaminants, from biological waste materials, permitting their separate and convenient disposal.

SUMMARY OF THE INVENTION

This invention provides method and apparatus for removing liquids from biological waste by the employment of mechanical force such as centrifugal force to separate the liquid from biological waste and into a container separate from a biological waste container, permitting the solid biological waste and removed liquid to be separately and conveniently disposed of. In the invention, wet biological waste is placed in a container, which is preferably foraminous or porous, and the container and the contained wet biological waste are provided with sufficient centrifugal force to urge liquid from the biological waste and from the container for collection and for separate disposal of the solid biological waste and the removed liquids.

In a preferred method of the invention, a rotatable foraminous drum is rotatably supported within an outer liquid-tight drum, and a disposable porous container, such as a bag made of porous material, is placed within the rotatable foraminous drum. Biological waste is placed within the porous, disposable container within the rotatable foraminous drum, and the rotatable foraminous drum is rotated at a rate of rotation sufficient to substantially transfer unabsorbed liquid from the biological waste through the disposable porous container and the foraminous inner drum to the outer liquid-tight collection drum. Solid biological waste may then be disposed of by removing the disposable porous container from the foraminous rotatable drum with the solid biological waste therein, avoiding, by closure of disposable porous container, exposure of handling personnel to the solid biological waste. The collected decontaminants and other liquids may be separately disposed of by pumping them into a sanitary sewer. If it is desired, additional liquid, such as a microbial decontaminating agent or water, may be added within the porous disposable bag as it is being rotated by the foraminous drum.

A preferred apparatus of the invention includes a liquid-tight container; a foraminous biological waste container rotatably supported within the liquid-tight container with an opening for the insertion of wet biological waste; driving means for rotating the biological waste container, the driving means and biological waste container cooperating to provide, upon rotation, sufficient centrifugal forces acting on the wet biological waste to urge fluids from the wet biological waste and the biological waste container and into the liquid-tight container; and means for removing the liquid from the liquid-tight container. In preferred apparatus of the invention, the biological waste container is provided with a porous disposable filter located inside of the container and the container may be provided with large openings. Such a porous disposable filter is preferably in the form of a container, such as a porous bag, having a mouth which engages and is retained by the biological waste container at its opening.

More specifically, a preferred apparatus of the invention includes a base support and the liquid tight container comprises an outer drum including a cylindrical side forming an open top and a bottom opposite the open top, with the outer drum being supported adjacent the bottom by a floor plate carried by but vibrationally isolated from the base support. The biological waste container comprises an inner drum formed by a foraminous cylindrical side, with a waste-receiving opening at one end and a bottom at the other end. The bottom of the inner drum has an axial shaft rigidly fastened to the inner drum on its central axis. The inner drum shaft extends through a central opening in the bottom of the outer drum, and the bottom of the outer drum carries a rotating seal for the inner drum shaft. The inner drum shaft is rotatably carried by a plurality of bearings supported by the floor plate of the apparatus. The base support also carries rotating drive means for the inner drum, which preferably includes a driven pulley mounted to the inner drum drive shaft, a motor carried by the base support with a drive pulley on its driven shaft, and a drive belt engaged with the drive pulley of the motor and the driven shaft of the inner drum.

Operation of the motor of the rotating drive means rotates the inner drum at a rate sufficient to urge fluids, such as microbial decontaminating liquids, from biological waste placed within the inner drum. Microbial decontaminants, such as liquid sterilizing, disinfecting, sanitizing and other microbial decontaminating agents, are frequently used to decontaminate biological waste. As indicated above, the apparatus is preferably combined with an inner bag formed, at least in part, by a flexible porous material and having a mouth suitable for engagement with and retention by the waste receiving opening of the inner drum. The pores of the flexible porous material are sufficiently small to prevent passage of biological waste particles of significant size through the porous material into the outer drum, preferably with dimensions as small, for example, as 0.015 inch and less. The preferred apparatus also includes a pump carried by the base support and having its inlet connected to the outer drum adjacent its bottom and its outlet connectable to some means for disposal of the liquid collected in the outer drum.

Preferred apparatus includes a housing for the base support and outer drum which forms an access opening to the waste-receiving opening of the inner drum. The housing can extend upwardly and over the open top of the outer drum and the waste-receiving opening of the inner drum to form the access opening at an acute angle over the waste-receiving opening of the inner drum in a position to conveniently accept a portable waste container. The housing can further carry a funnel-like waste-directing surface within the housing adjacent the access opening to accept a portable waste carrier and to direct biological waste into the waste-receiving opening of the inner drum. The housing can further carry means for directing a spray of liquid into a portable waste carrier to flush the biological waste from the interior of the carrier and/or direct liquid into the interior of the inner drum during its operation.

Other features and advantages of the invention will be apparent from the drawings and the further, more detailed, description which follows.

DETAILED DESCRIPTION OF THE DRAWINGS

DESCRIPTION OF THE INVENTION

Figure 1:
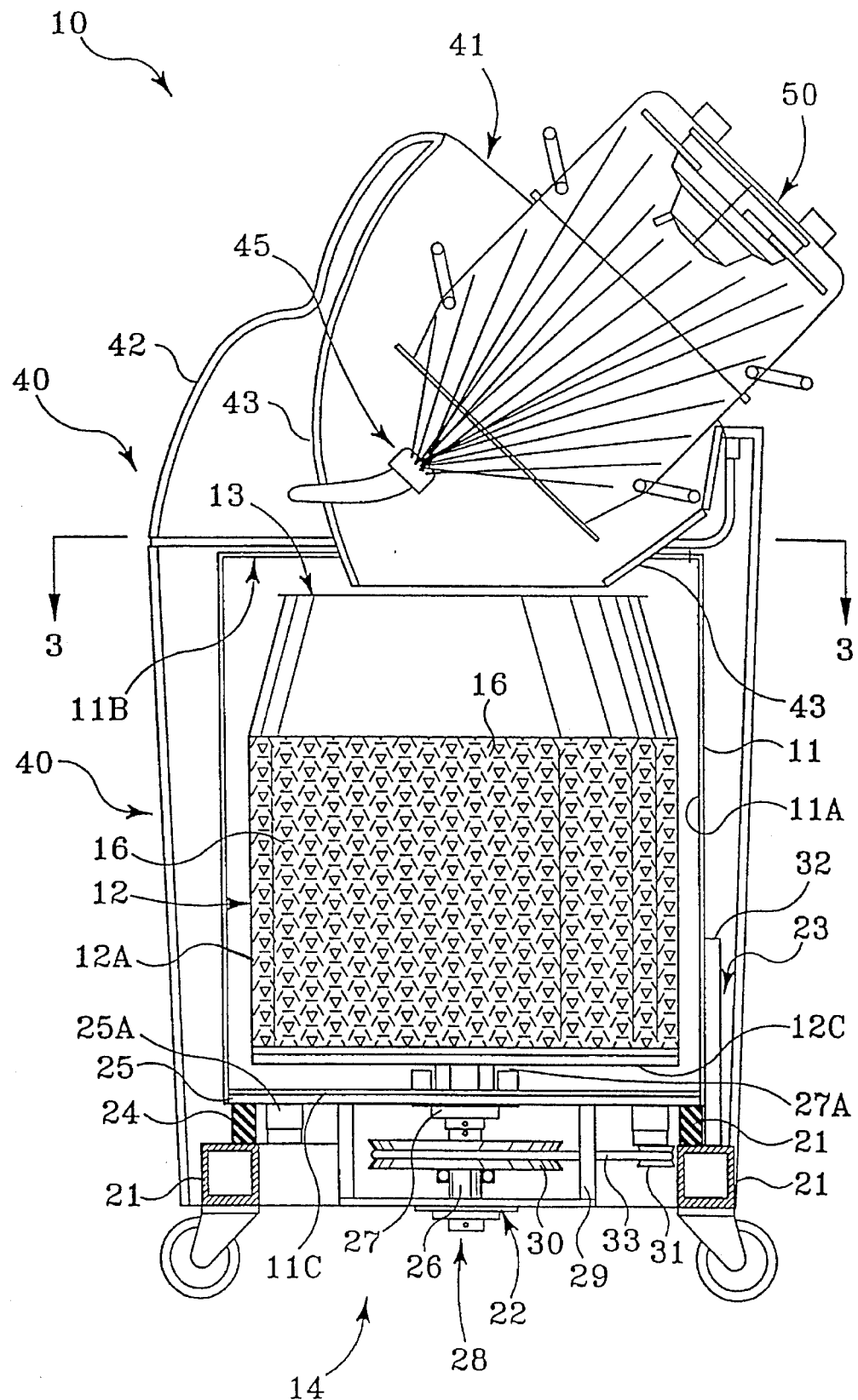
FIG. 1 is a cross-sectional view of an apparatus of the invention taken at a plane corresponding to line 1—1 of FIG. 2.

FIG. 1 is a cross-sectional view of an apparatus 10 of this invention. Primary elements of the invention, as shown in FIG. 1, are a liquid-tight container 11, a biological waste container 12 rotatably supported within the liquid-tight container 11 with an opening 13 for the insertion of wet biological waste, driving means 14 for imposing centrifugal force on the container 12 and its waste contents, and means 15 (FIG. 3) for removing liquid from the liquid-tight container 11. As indicated in FIG. 1, the biological waste container 12 can, preferably, be provided with a multiplicity of small foramina 16, with each of the small foramina having a sufficiently small size to bar the passage of biological waste after it has been disintegrated or minced. Such foramina may be formed by piercing or punching a sheet metal container sidewall 12a, or by a sidewall 12a formed by screen material, such as a stainless steel mesh screen, or by a sidewall 12a that has been formed with large openings having dimensions on the order of several inches but supporting foraminous wire mesh or screen material over the large openings.

Figure 4:
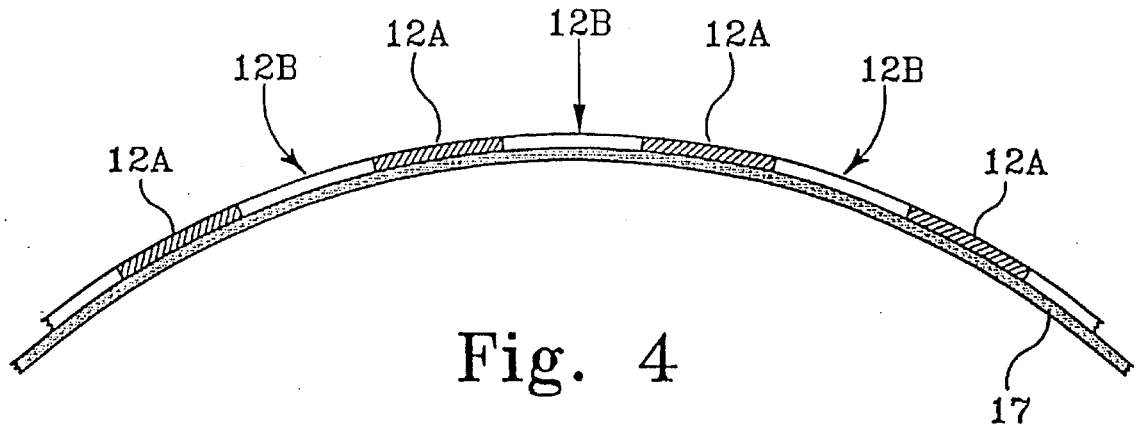
FIG. 4 is a diagrammatic partial cross-section of a portion of a foraminous biological waste container with a porous disposable filter inside the container over the foramina.
Figure 5:
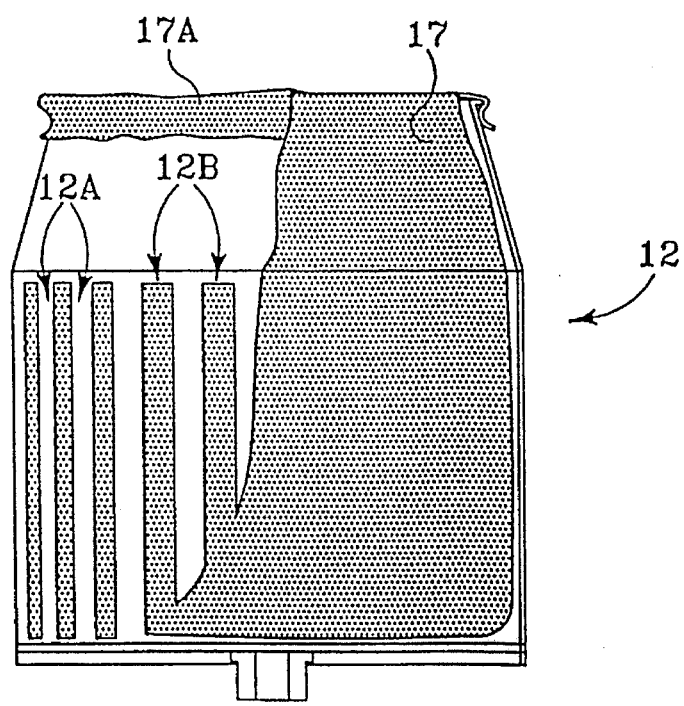
FIG. 5 is a partially cut-away view of a foraminous biological waste container of a preferred apparatus of this invention, including a disposable porous bag for the biological waste.

In preferred embodiments of the invention, a porous disposable filter 17 may be located inside of the biological waste container 11 as shown in FIG. 4 and the sidewalls 12a of the biological waste container 12 may be provided with a plurality of large openings 12b. In the broadest sense, the porous disposable filter 17 may be formed by any fibrous material having pore sizes with dimensions less than about 0.015 inch and sufficient wet strength to resist the centrifugal forces imposed on the porous disposable filter and contained waste. Preferably, the porous disposable filter may be an inexpensive woven cotton fabric similar to that used in household bed sheets but may be a non-woven fibrous material, such as spun bound polyester fibers. The porous disposable filter 17 will preferably be in the form of a container for the biological waste, still more preferably, as a flexible bag-like cloth container having a mouth 17a which engages and is retained by the container 12 at its opening 13.

Figure 3:
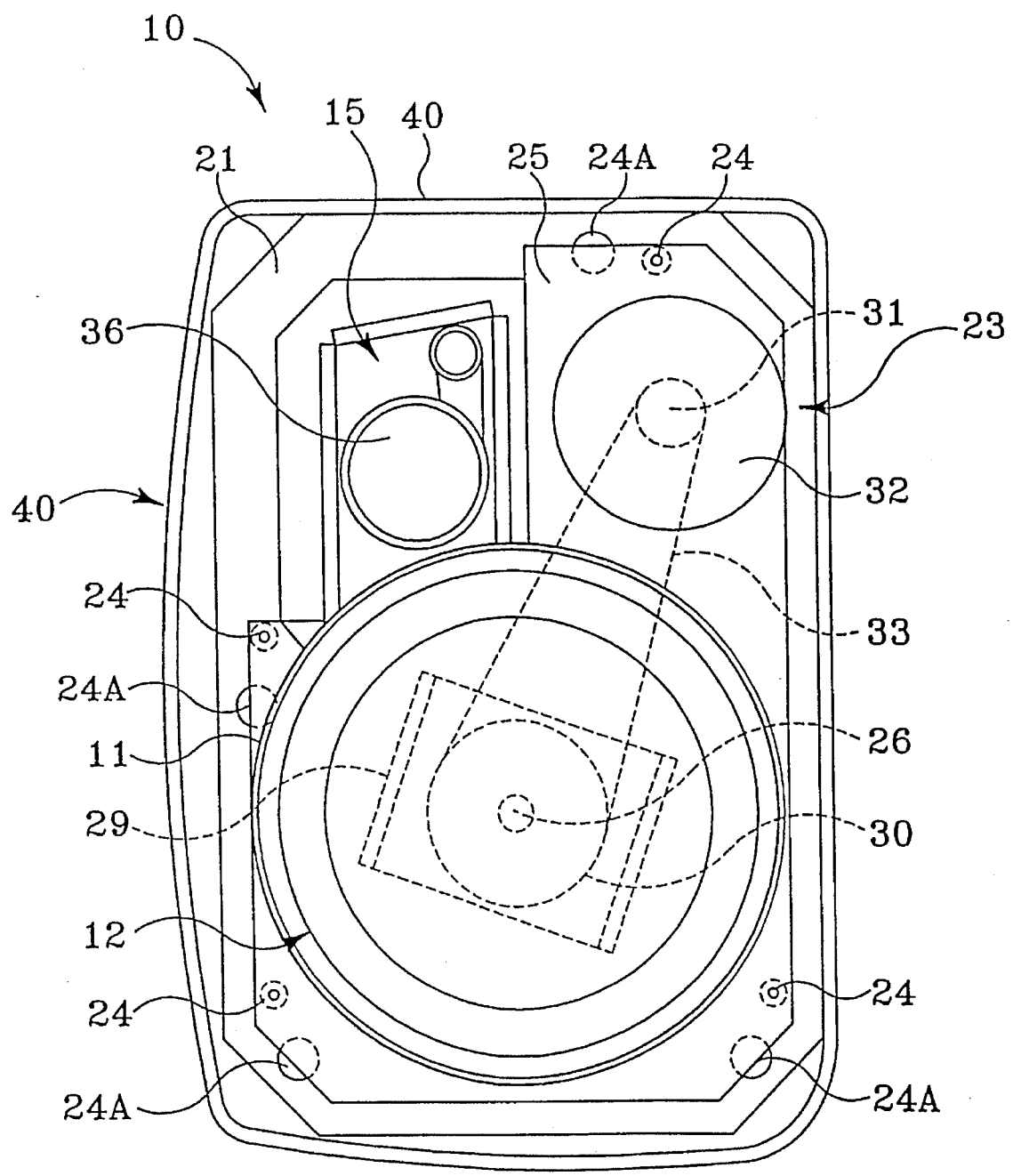
FIG. 3 is a view from below taken at a plane corresponding to line 3–3 of FIG. 1.

As shown in FIGS. 1 and 3, the apparatus of the invention includes a base support 21 which may be formed from rigid metal, such as a weldment of angle iron, steel or aluminum to provide support for the liquid-tight container 11, the biological waste container 12 and its rotatable supporting means 22, the rotating driving means 23 for the inner drum 12 and the means 15 for removing liquid from the liquid-tight container 11.

Figure 6:
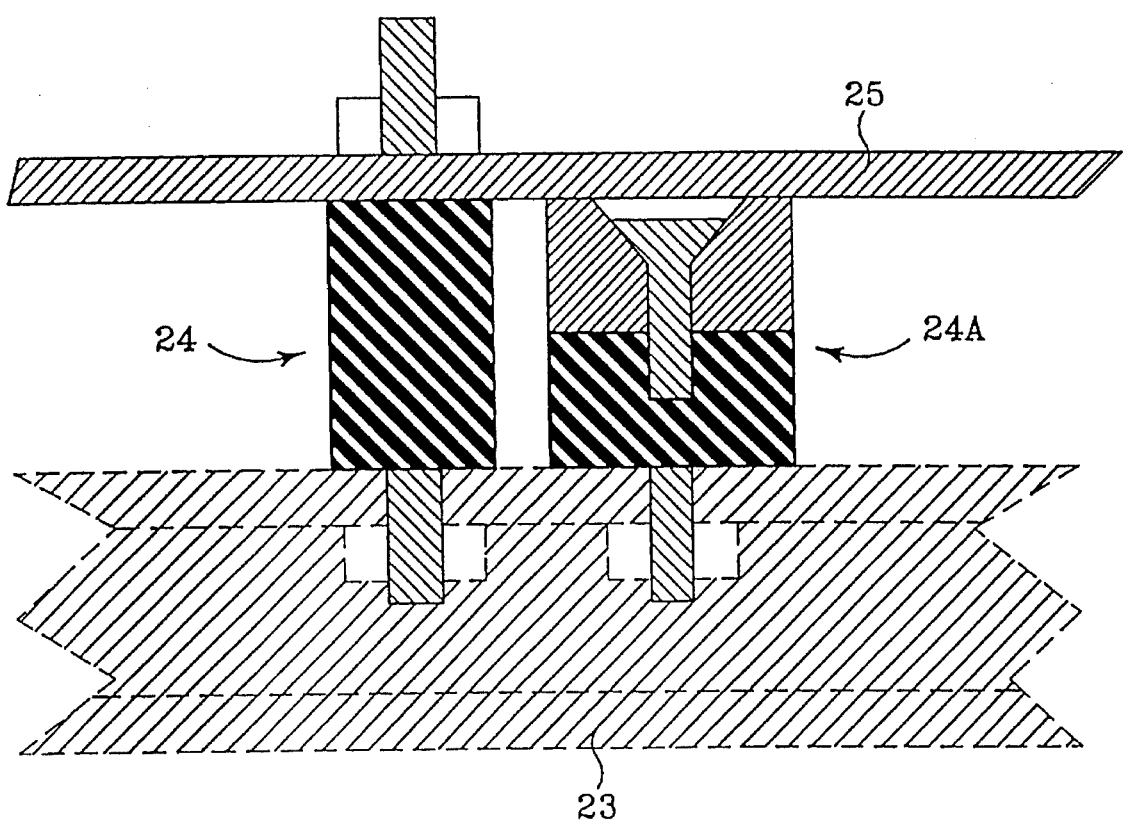
FIG. 6 is a partial cross-sectional drawing of the mounting means of a preferred apparatus of the invention.

As shown in FIGS. 1 and 3, the liquid-tight container preferably comprises an outer drum 11 formed by a cylindrical sidewall 11a forming an open top 11b. The outer drum 11 is supported adjacent its bottom by a floor plate 25 mounted on the base support 21 with a plurality of elastomeric vibration isolators 24 and self adjusting glides 24a (FIG. 6). As shown in FIGS. 1, 3 and 6, four spaced vibration isolators 24 isolate floor plate 25 from the base support 21, and four spaced self adjusting glides 24a allow side to side movement while providing isolated vertical support of the floor plate 25. The bottom 11c of the outer drum 11 includes a central opening and carries a rotating seal, and an antifriction bearing 27 for the rotatable support of inner drum 12 is carried by floor plate 25 and bottom 11c of the outer drums 11. Also, rotating seal assembly 27a provides a barrier against liquids escaping the outer drum 11.

The biological waste container preferably comprises an inner drum 12 formed by a foraminous cylindrical side 12a forming the waste-receiving opening 13 at its top. The foraminous cylindrical sidewall 12a may be formed, as described above, by punched sheet metal, wire mesh or screen, or a combination thereof or may, as described above, include a few large openings where an internal filter or porous container is used. The foraminous inner drum 12 is provided with a rigid bottom 12c. An axial shaft 26 is rigidly fastened to the bottom 12c of inner drum 12 on its central axis.

The outer and inner drums 11 and 12 may be formed from any corrosion-resistant material or any material which may be coated or treated to avoid its deterioration by exposure to water and decontaminating agents. For example, a liquid-tight outer drum 11 and inner drum 12 may be formed from plastic or corrosion-resistant metals such as aluminum and stainless steel, or it may be formed from steel which has been provided with the corrosion-resistant resinous or porcelain coating.

The axial shaft 26 of the inner drum 12, as shown in FIGS. 1 and 3, extends through the central opening of the liquid-tight outer drum 11, and the rotating seal and bearing assembly 27, 27A which is mounted to the bottom 11c of the liquid-tight outer drum and the floor plate 25. As further shown in FIG. 1, the axial shaft 26 of the foraminous inner drum 12 is rotatably supported on a thrust bearing 28, which is carried by a supporting framework 29 from the floor plate 25. The rotatable inner drum 12 is thus rotatably carried by a plurality of bearings 27, 28 supported by said floor plate 25 and vibrationally isolated from said base support 21.

As shown in FIGS. 1 and 3, the rotating drive means 23 for the inner drums comprises a driven pulley 30 mounted on the drive shaft 26 for the inner drum 12, a drive pulley 31 which is mounted on the drive shaft of a motor 32 and a drive belt 33 engaged with the driving pulley 31 and the driven pulley 30 to transfer the rotating energy of the motor 32 to the inner drum 12.

The drive means 23 and biological waste container 12 cooperate to provide, upon rotation of the biological waste container, sufficient centrifugal force acting on wet biological waste to urge the liquid from the biological waste through the openings 16 and into the liquid-tight container 11. The motor 32, the pulleys 30 and 31 and belt 33 drive the inner drum 12 at such a rotational rate that the centrifugal force acting on the wet biological waste forces the wet biological waste against the interior of inner drum sidewall (and any porous filter 17 therein) and urges absorbed liquid from the biological waste through the openings 16 of the inner drum 12, through any porous filter material 17 within the drum, and into the liquid-tight outer container 11. For example, where the cylindrical walls 12a of the inner drum 12 form a right circular cylinder having a diameter on the order of 12 to 18 inches, the inner drum 12 can be rotated on the order of 600 to 700 revolutions per minute and provide satisfactory removal of liquid from wet biological waste. Such rotational speeds can be conveniently provided by a 1700–1800 rpm electric motor and appropriately sized pulleys 30, 31.

The speed of rotation of the biological waste container 12 will depend upon the diameter of the biological waste container and the porosity of any disposable filter material 17 between the wet biological waste and the liquid-tight container 11. It is preferable therefore, that any disposable filter material 17 be as porous as possible without allowing the passage of particles of solid biological waste material.

As shown in FIG. 3, the apparatus 10 can be provided with means 15 for removing liquid from the liquid-tight outer container 11. The liquid removal means 15 can be an integral part of the liquid tight container 11 and can contain a pump and motor assembly 36, preferably a self contained submersible unit, for removal of the filtered liquids. The liquid removal means 15 extends below the plane of the bottom of the liquid tight container 11 and the base support 21 to form a reservoir for the collection of the liquid for removal by the pump assembly 36.

While not shown in the Figures, the outer liquid-tight drum 11 may include a liquid removal opening adjacent its bottom and the pump 36 may have an inlet connected by conduit (not shown) with a liquid removal opening adjacent the bottom of the liquid-tight outer drum 11. The outlet of the pump may be connected with a flexible conduit to deliver liquid from the liquid-tight drum for disposal, for example, through a sanitary sewer. Such a pump may be a pump made by Rube and sold as its model 1800.

Figure 2:
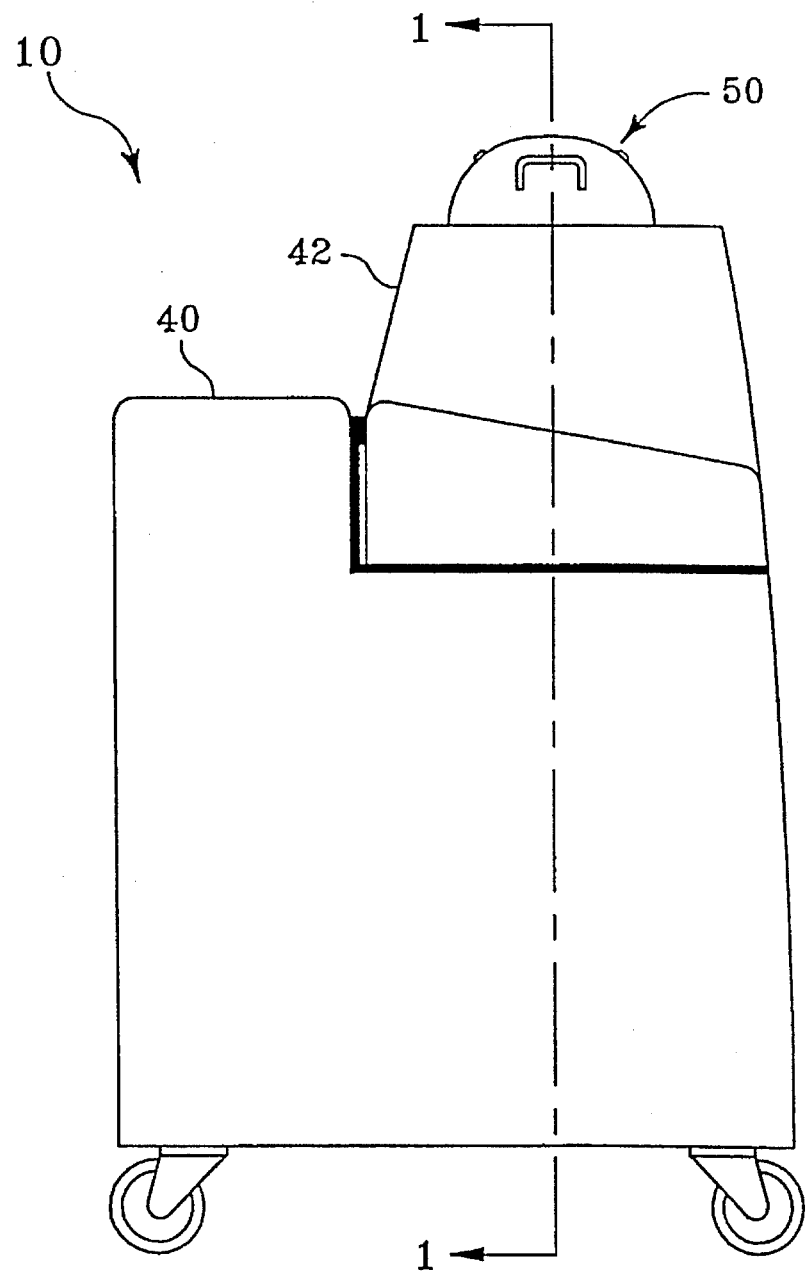
FIG. 2 is a partially sectioned drawing of the apparatus of FIG. 1 as viewed from the left of FIG. 1.

As further shown in FIGS. 1–3, the apparatus 10 preferably comprises a housing 40 forming an access opening 41 providing access to the waste-receiving opening 13 of the rotating inner drum 12 and the interior of any disposable filter bag 17 carried within the inner drum 12. As shown in FIGS. 1 and 2, the housing includes an upper portion 42 which extends upwardly and over the open top 11b of the outer drum 11 and the waste-receiving opening 13 of the inner drum 12 to accept a portable waste container 50. Preferably, the top portion 42 of the housing 40 forms the access opening 41 at an acute angle over the waste-receiving opening 13 and further carries funnel-like waste directing surfaces 43 within the housing 40 adjacent the access opening 41 to accept a portable waste carrier 50 and direct biological waste from the container 50 into the waste-receiving opening 13. As indicated in FIG. 1, the funnel-like waste directing surfaces 43 may engage the container 50 and support it for removal of the biological waste.

As further shown in FIG. 1, the housing 40 may carry a means 45 for directing a spray of liquid into the waste carrier 50 when positioned within the funnel-like waste directing surface 43. Such a liquid directing means 45 may also be redirected and used, if desired, to direct a spray of liquid through the waste-receiving opening 13 of the inner drum 12 during rotation of the inner drum to provide additional water, or microbial decontaminating agents onto the biological waste while it is being processed by the apparatus.

This invention thus provides a method of removing liquid, such as a decontaminating agent, from wet biological waste, which can include mixtures of a decontaminating liquid and disintegrated or minced biological waste that have been processed for disposal.

In the method of the invention, the wet biological waste is placed in a porous container and the porous container and contained wet biological waste are provided with sufficient centrifugal force to urge liquid from the wet biological waste through the porous container and to remove substantially all the unabsorbed liquid from the porous container and the biological waste, and the separated liquid can be disposed of separately from the solid biological waste remaining in the porous container.

In a preferred aspect of the method of the invention, a rotatable foraminous drum is provided and rotatably supported within an outer liquid collection drum. A disposable porous bag-like container is placed within the rotatable foraminous inner drum. Biological waste, which may include a mixture of minced and disintegrated medical waste and a sterilizing liquid used in processing it for disposal, may be placed within the disposal porous container. The rotatable foraminous inner drum and the disposable porous container are then rotated together at a rate of rotation sufficient to substantially transfer liquid from the biological waste through the disposable porous container and the foraminous inner drum to the outer liquid collection drum. Thereafter, the disposable porous container and biological waste are removed together from within the foraminous inner drum for disposal.

As indicated above, if desirable, additional liquids such as water, or microbial decontaminating agents, can be added within the porous disposable container as it is being rotated, for example, by spraying the liquid onto the biological waste as it is rotating within the porous disposable bag.

While a presently preferred embodiment of the apparatus and method of the invention has been described above, it should be noted that the invention is defined only by the scope of the following claims and relevant prior art and is not necessarily limited to the preferred embodiments of apparatus and method specifically described above.

What is claimed is:

1. An apparatus for removing a decontaminating liquid from particles of biological waste, comprising:

a base support;

a first drum including a cylindrical sidewall forming an open top, said first drum being supported adjacent its bottom by a floor plate carried on vibration isolators by said base support, said first drum bottom including a central opening and carrying a rotating seal, a second drum including a cylindrical sidewall including a plurality of openings and forming a waste-receiving opening and a closed rigid bottom, said second drum bottom having an axial shaft rigidly fastened to and extending outwardly from said second drum on its central axis, said second drum shaft extending through the central opening and rotating seal of said first drum and being rotatably carried by a plurality of bearings supported by said floor plate;

a container formed, at least in part, by flexible porous material and having a mouth suitable for engagement with and retention by the waste-receiving opening of said second drum, the pores of said flexible porous material being sufficiently small to prevent passage of biological waste particles;

rotating drive means for said second drum, said rotating drive means comprising a driven pulley mounted to said second drum shaft, a motor carried by said base support including a driven rotating shaft and a drive pulley, and a drive belt engaged with said drive pulley of said motor and said driven pulley of said second drum, wherein operation of said motor rotates said second drum and container at a rate sufficient to urge decontaminating liquid from biological waste particles placed within the container.

2. The apparatus of claim 1 wherein said inner container is a bag formed from flexible porous material with sufficient wet strength to permit the removal of the container and the biological waste from the second drum for disposal.

3. The apparatus of claim 2 further comprising a housing for the base support and first drum, said housing forming an access opening providing access to the waste-receiving opening of the first drum and the container.

4. The apparatus of claim 3 wherein said housing extends upwardly and over the open top of said first drum and the waste-receiving opening of said second drum, said access opening is at an acute angle over said waste-receiving opening of said second drum to accept a portable waste carrier, said housing further carrying a funnel-like waste directing surface within said housing adjacent said access opening to accept said portable waste carrier and direct biological waste into said waste-receiving opening.

5. The apparatus of claim 4 wherein said housing carries means for directing a spray of liquid into said portable waste carrier when within the funnel-like waste directing surface.

6. The apparatus of claim 4 wherein said housing and funnel-like waste directing surface engage said portable waste carrier.

7. The apparatus of claim 1 wherein the plurality of bearings that support the second drum shaft comprises a thrust bearing at the lower end of the second drum shaft and at least one roller bearing having an outer race carried by the floor plate adjacent the driven pulley.

8. The apparatus of claim 1 wherein the first drum includes a liquid removal opening in or adjacent its bottom, and the base support carries a pump having an inlet connected directly to said liquid removal opening.

9. An apparatus for separately disposing of solid and liquid biological waste, comprising:

a portable container for wet biological waste, a liquid-tight container, a foraminous biological waste container, with small foramina sized to bar passage of biological waste, supported for spinning within the liquid-tight container with an opening adapted to the receive wet biological waste from said portable container, driving means for spinning said biological waste container, said driving means and said biological waste container cooperating to provide, upon spinning, sufficient centrifugal force acting on the wet biological waste to urge liquid from the wet biological waste through the foramina and into the liquid-tight container, and means for removing liquid from the liquid-tight container.

10. The apparatus of claim 9 wherein said foramina engage the biological waste upon spinning.

11. The apparatus of claim 9 wherein the biological waste container is provided with openings and with a porous disposable filter located inside of the container and over the openings.

12. The apparatus of claim 11 wherein the porous disposable filter provides a container for the biological waste.

13. The apparatus of claim 12 wherein the porous disposable filter container has a mouth which engages and is retained by the biological waste container at its opening.

14. The apparatus of claim 11 wherein said porous disposable filter container has pores with dimensions smaller than about 0.015 inch.

15. The apparatus of claim 9 further comprising means for engaging and positioning a portable waste container and for guiding waste into the mouth of the biological waste container.

16. The apparatus of claim 9 further comprising means for directing a flow of liquid into the biological waste container.

17. The apparatus of claim 16 wherein said liquid directing means is operated during spinning of said biological waste container.

18. The apparatus of claim 9 wherein said means for removing liquid from said liquid-tight container is a pump selectively operated to deliver liquid from the liquid-tight container to a sewer.

19. An apparatus for removing liquid from wet biological waste, comprising:

a portable waste container, a liquid-tight container, a biological waste container, supported for spinning within said liquid-tight container with an opening for the insertion of wet biological waste, driving means for spinning said biological waste container, said driving means and said biological waste container cooperating to provide, upon spinning, sufficient centrifugal force acting on the wet biological waste to urge liquid from the wet biological waste and into the liquid-tight container, means for engaging and positioning the portable waste container and for guiding waste into the mouth of the biological waste container, and means for directing flow of liquid into the portable waste container and flushing waste from the container.

20. An apparatus for removing liquid from wet biological waste, comprising:

a liquid-tight container, a biological waste container, supported for spinning within said liquid-tight container with an opening for the insertion of wet biological waste, means for engaging and positioning a portable waste container and for guiding the waste from the portable waste container into the mouth of the biological waste container, driving means for spinning said biological waste container, said driving means and biological waste container cooperating to provide, upon spinning, sufficient centrifugal force acting on the wet biological waste to urge liquid from the wet biological waste and into the liquid-tight container, and means for removing liquid from the liquid-tight container.

21. The apparatus of claim 20 wherein said means for engaging and positioning a portable waste container and for guiding the waste from the portable waste container into the mouth of the biological waste container carries means for directing a flow of liquid into the portable waste container.

22. The apparatus of claim 21 wherein said means for directing a flow of liquid can also direct a flow of liquid into the biological waste container.

23. Apparatus for removing liquids from wet biological waste comprising:

a rotatable foraminous inner drum, rotatably supported within an outer liquid collection drum, a disposable porous container positioned within the rotatable foraminous inner drum, means for engaging a container of wet biological waste for insertion of wet biological waste within the disposable porous container, and means for rotating the rotatable foraminous inner drum at a rate of rotation sufficient to substantially transfer liquid from the wet biological waste through the disposable porous container and foraminous inner drum to the outer liquid collection drum, and to substantially dry the wet biological waste, the disposable porous container being removable from the foraminous inner drum with the substantially dried biological waste therein and disposable with the substantially dried biological waste.

24. The apparatus of claim 23 including means for adding liquid within the porous disposable container as it is being rotated.

25. The apparatus of claim 24 wherein the liquid includes a decontaminating agent.

26. The apparatus of claim 25 wherein the liquid includes a sterilizing agent including peracetic acid.

27. The apparatus of claim 23 further comprising a controllable means for removing liquid from the outer liquid collection drum.

* * * * *